Aug. 20, 1946.　　　　G. WEISS　　　　2,406,051
APPARATUS FOR PRODUCING CORRUGATED STRUCTURES
Filed June 26, 1943　　　3 Sheets-Sheet 1

INVENTOR.
Gerhart Weiss
BY Pineles & Greene
ATTORNEYS

Aug. 20, 1946.  G. WEISS  2,406,051
APPARATUS FOR PRODUCING CORRUGATED STRUCTURES
Filed June 26, 1943  3 Sheets-Sheet 2

INVENTOR.
Gerhart Weiss
BY
ATTORNEYS

Aug. 20, 1946.　　　　　G. WEISS　　　　　2,406,051
APPARATUS FOR PRODUCING CORRUGATED STRUCTURES
Filed June 26, 1943　　　3 Sheets-Sheet 3

INVENTOR.
Gerhart Weiss
BY
Pinelas & Greene
ATTORNEYS

Patented Aug. 20, 1946

2,406,051

UNITED STATES PATENT OFFICE 2,406,051

APPARATUS FOR PRODUCING CORRUGATED STRUCTURES

Gerhart Weiss, Sunnyside, N. Y., assignor of twenty-five per cent to Paul Porzelt, New York, and twenty-five per cent to Fritz Lunzer, Kew Gardens, N. Y.

Application June 26, 1943, Serial No. 492,409

1 Claim. (Cl. 154—30)

My invention relates to certain novel corrugated structures and the apparatus for producing the same, and more particularly my invention relates to certain novel corrugated structures comprising resin impregnated fibrous materials and certain apparatus for continuously forming such structures.

Certain problems arise in connection with the manufacture of corrugated structures from resin impregnated fibrous materials because of the particular properties of the resin impregnated component parts in the structure and operations involved in forming and maintaining the corrugated shape of the structure.

It is a further object of the present invention to provide a novel apparatus for continuously forming resin impregnated corrugated structures of tubular shape.

It is a further object of the present invention to provide a continuous apparatus for forming resin impregnated corrugated structures which contain metal inserts or core elements.

It is a further object of the present invention to provide a continuous process for shaping resin impregnated fibrous sheets to corrugated form and enclosing in the continuation of the same operation, said corrugated structure within the resin impregnated liner elements.

Further objects will be apparent from a consideration of the drawings and a specific description thereof which here follows.

Figure 1:
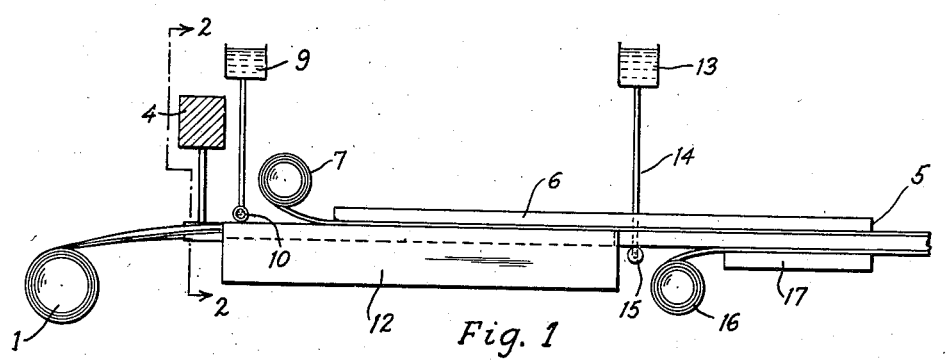
Figure 1 is a side schematic view of the apparatus for forming a corrugated structure.
Figure 2:
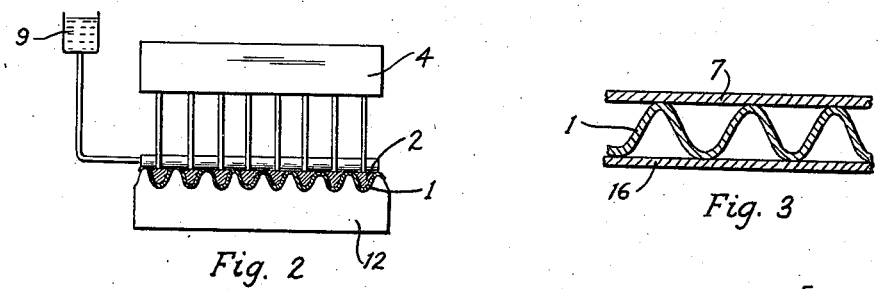
Figure 2 is a cross section taken along the line 2—2 of Figure 1 showing the corrugated forming elements.
Figure 4:
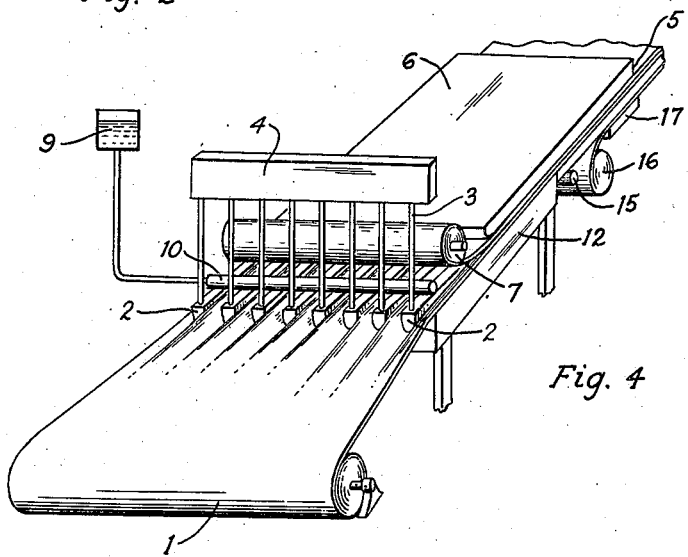
Figure 4 is a perspective end view of the corrugated structure forming apparatus of my invention.

Referring now more specifically to Figure 1, Figure 2 and Figure 4, I show a roll 1 of resin impregnated fibrous material such as paper, which has been impregnated with a urea or phenol formaldehyde condensation product or a thermo plastic resin such as a vinyl compound, as for example vinyl acetate, vinyl chloride or copolymers thereof or polyvinyl acetal, butyral etc. The resin impregnated paper 1 passes first under shaping elements 2 supported by rods 3 from a support 4. The shaping elements 2 comprise long rods which extend longitudinally along the apparatus and which rods may terminate at the end 5 of the upper element 6 of the pressing apparatus which presses the upper liner element 7 on to the corrugated element.

The core members 2 may have a shape dictated by the shape of the corrugations to be formed and here are in the form of curved members so that the conventional curved or sine wave corrugation is formed.

The support 5 and the supporting elements 3 firmly hold the shaping rods 2 in position so that the corrugations are formed in proper space relation with one another.

From an adhesive tank 9 adhesive is supplied through a doctor element 10 on to the upper portions of the corrugated sheet 1 so that when the resin impregnated corrugated liner element 7 is fed down onto the corrugated sheeting 1 and pressed thereon by the upper pressing element 6, adhesion is effected between the liner element 7 and the corrugated sheeting 1. The corrugated sheeting passes over the table 12 where it may be heated to first effect the softening of the thermo plastic resin with which the corrugated and liner elements have been impregnated.

From an adhesive tank 13, adhesive is fed through a tube 14 and a doctor applicator 15 through the bottom of the corrugated sheeting 1 whereupon a bottom liner element 16 is pressed on to the bottom of the corrugated sheeting 1 by a pressure element 17. By means of this apparatus I can continuously form a corrugated sheeting in which the corrugations are properly molded into the resin impregnated sheeting 1 and this precise corrugated structure is maintained by rod inserts while the liner elements are being applied under pressure to the corrugated sheeting.

Figure 3:
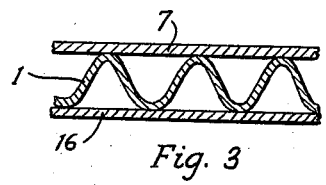
Figure 3 is a cross section of the corrugated element formed according to my invention.

In Figure 3 I show a corrugated sheeting formed by the process here set forth in which between the upper liner 7 and the lower liner 16 is disposed the corrugated element 1.

The shaping members 2 may either be solid core or they may comprise a three-part sectional element that can be spread by pressure downwardly applied thereto.

Figure 5:
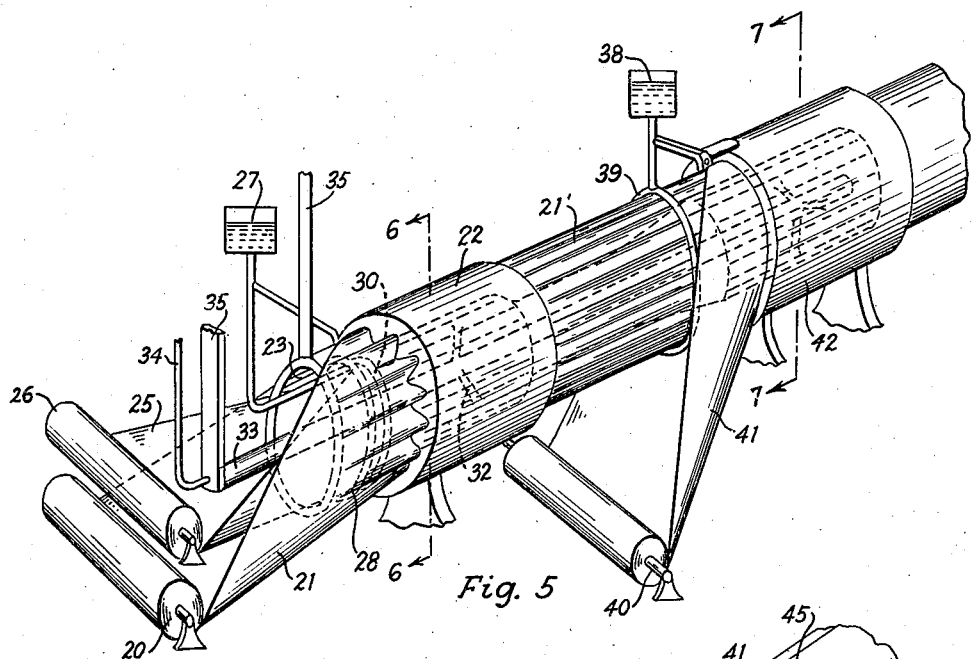
Figure 5 is a perspective view of another form of my invention showing the apparatus and means by which tubular corrugated structures can be continuously formed.

In Figure 5 I show an apparatus and a method by means of which I can continuously form tubular corrugated resin impregnated structures. From a roll 20 a sheet of resin impregnated paper 21 is fed between an external corrugated shaping element 22 and an internal corrugated shaping element 23 made up of a series of rods having a shape that conforms to the inside shape of the shaping member 22. The resin impregnated paper 21 passes between the shaping elements 22 and 23 and may be preliminarily softened by heating if the resin which impregnates the paper is thermoplastic or heat softenable. Upon being so softened, the paper as it passes between the shaping members 22 and 23 forms to a corrugated shape.

A resin impregnated liner sheet 25 is fed from a roll 26 and adhesive is applied to the outer surface thereof from an adhesive tank 27 through an adhesive applicator ring 28. The adhesive coated liner material 25 is then led over a sectional shell 30 (see Figure 6) whereby it is pressed into adhesive contact with the resin impregnated paper 21 which has been shaped to corrugated form. The sectional shells 30 are supported by arms 32 which are supported centrally by a rod 33.

A steam line 34 runs through the rod 33 to supply heat to soften the resin impregnated corrugated liner elements for their shaping and adherence and in the case of the use of a thermo setting resin, to apply heat thereto to effect a curing of these elements when their proper shaping has been effected.

The central rod 33 is supported by a support 35. The resin impregnated sheet 21 with the inner liner 25 attached thereto emerges from the shaper 22 and is indicated as 21'. From an adhesive tank 38 and through an adhesive feed ring 39 the corrugated sheeting 21' is coated with an adhesive. From a roll 40 a sheet of resin impregnated paper 41 is led over the corrugated sheeting and by means of a pressing element 42, the resin impregnated outer liner element 41 is adhesively secured over the corrugated sheeting 21'. Thus, by continuous operation I shape a resin impregnated sheet to corrugated form and while in such corrugated form I attach in adhesive relation thereto an inner liner element 25 and an outer liner element 41. The application of heat is so controlled that in the case of a thermo plastic resin being used, the heat is applied to soften the resin and after shaping is effected the structure is cooled either by the non use of heat or by the use of cooling means to set the thermo plastic resin impregnated sheet in the structure formed.

Figure 6:
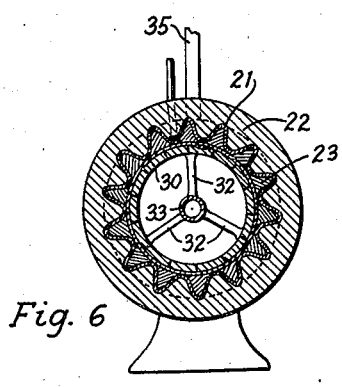
Figure 6 is a cross section of the apparatus of Fig. 5 along the line 6—6 of Figure 6.

Figure 6 is a cross sectional view, taken along the line 6—6 of Figure 5.

Figure 7:
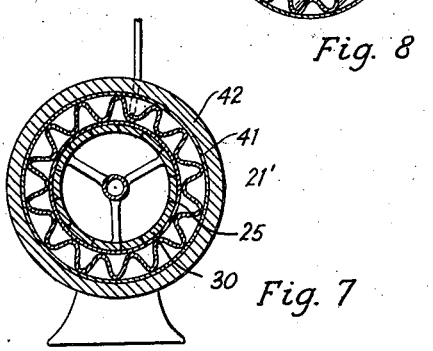
Figure 7 is a cross section taken along the line 7—7 of Figure 5.

Figure 7 is a cross section taken along the line 7—7 of Figure 5.

Figures 6 and 7 are cross sectional views that will assist in the understanding of the operation of the apparatus shown in Figure 5.

Figure 8:
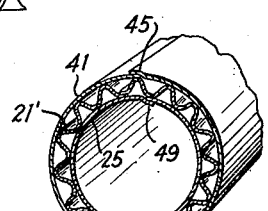
Figure 8 is a perspective of the tubular corrugated structure formed by the apparatus shown in Figure 5.

In Figure 8 I show the resin impregnated corrugated tubular structure which is a product of the apparatus and method shown in Figures 5, 6 and 7, and which comprises the inner liner 25, the outer liner 41 and the corrugated element 21'.

The inner liner 25 is overlapped at 44 and the outer liner 41 is overlaped at 45, this overlapping of the liner elements as well as of the corrugated element 21' being effected to secure a firm adhesive end joint.

Figure 9:
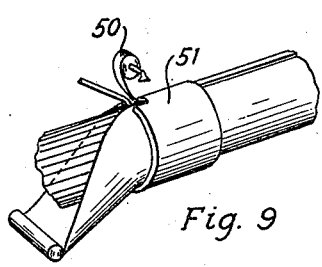
Figure 9 is a detailed perspective showing the application of the sealing strip to the joint of the tubular corrugated structure.

In Figure 9 I show a modification of my invention in which the end joining of the liner element is effected by the application of an adhesive tape 50 to the joint where the outer liner element meets and a pressure member 51 firmly applies the adhesive tape 50 to the joint.

Figure 10:
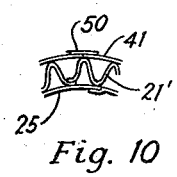
Figure 10 is a partial cross section showing the sealing of the tubular corrugated structure by the tape as shown in Figure 9.

In Figure 10 I show a cross section of a corrugated structure so formed in which the adhesive tape 50 is applied over the outer liner element 41.

Figure 11:
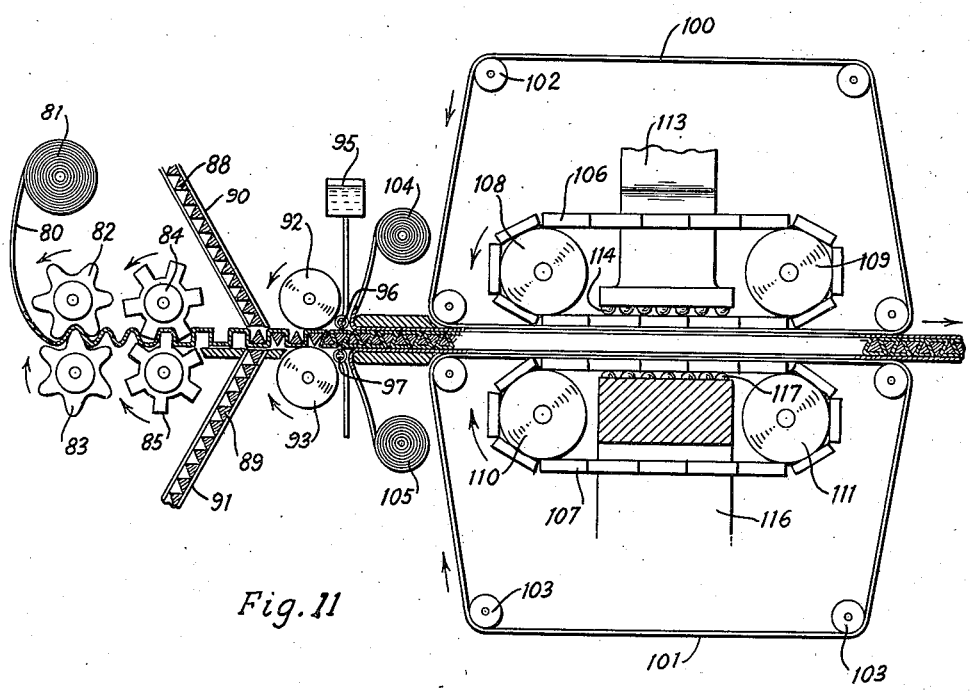
Figure 11 is another modified forming of my apparatus in which I show an apparatus for continuously producing a corrugated structure.

In Figure 11 I show the apparatus for continuously forming a corrugated structure in which a strip of resin impregnated fibrous material 80 is fed from a roll 81 through a first set of shaping rolls 82 and 83 which apply a general corrugated shape to the plastic strip 80 and a second set of shaping rolls 84 and 85 which impart a block shaping to the strip material. The block shaped corrugated strip material is carried along between rods 88 and 89 which are fed by means of tracks 90 and 91 into the openings in the corrugated strip 80 so that a rod insert falls into each opening as shown. The rods are disposed in opposed relation to one another for the purposes explained hereinafter.

When the rod is to remain in place after manufacture as in the manufacture of armor plating, then the rod is coated with an adhesive. When the rod simply acts as a core to facilitate in proper shaping of the corrugated element, then the rod is coated with a lubricating composition which may be either a lubricant by its own characteristic or a substance which upon application of heat adjacent thereto becomes soft and the rod can thus be disengaged therefrom.

The corrugated strip 80 with the rods 88 and 89 now positioned in adjacent corrugations thereof pass through rolls 92 and 93 which operate at a higher speed than the roller members next encountered in the apparatus, and accordingly press the corrugations so as to close the corrugations about the core elements and form triangular enclosures about said core members 88 and 89.

From an adhesive tank such as 95, adhesive is applied by means of doctor elements 96 and 97 to the external portions of the corrugations 80. The adhesive coated corrugated resin impregnated strip 80 with the cores contained therein then passes between two chromium plated continuous belts 100 and 101 which are rotated over rolls 102 and 103 by a suitable driving mechanism. The chromium plated belts 100 and 101 come in smooth and slipping contact with the liner elements 104 and 105 which are applied upon the adhesive coated corrugated strip element 80. A pair of continuously rotating endless plate block chains 106 and 107 rotating about wheels 108, 109, 110, 111, act to transmit pressure from the hydraulic press 113 through the ball bearing surface 114 thereon and from stationary platen 116 and the ball bearing surface 117 thereon.

Pressure transmitted from the hydraulic press 113 is applied through ball bearings 114 seated in that surface on to the heavy plates 106 and similar pressure is applied from the table 116 below to the ball bearings 117 to the track 107, the tracks 106 and 107 applying pressure through the chromium belts 101 to the corrugated strip 80 positioned between the liner elements 104 and 105. Thus I firmly apply pressure to the corrugated structure to cause the thermo plastic to flow and set, or in the case of a thermosetting compound, to cause the thermosetting compound, which is impregnated into the fibrous material, to be cured and to firmly bond all parts of the corrugated structure together.

By the heat application set out herein, a hard strong resin impregnated corrugated structure is obtained.

I may also employ as the impregnated agent Vinsol, sold by the Hercules Powder Co. and which is an extract of yellow pine trees, certain silicates, such as sodium and potassium silicate, preferably treated with an acid so that the silicate is set in place in the fibrous material, vinylidine chloride and chlorinated paraffins. These resins may also be applied to the fibrous material by dipping, spraying, brushing or any other suitable applicator means and heat and subsequently cold is applied to take advantage of the thermo plastic nature of the materials employed.

Figure 12:
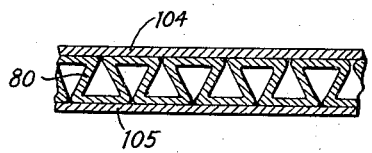
Figure 12 is a cross section of a modified form of my invention.

It is also within the scope of my invention to form the corrugated middle elements, such as element 1 shown in Figure 3, or the element 80 shown in Figure 12, by extruding a plastic mass comprising sawdust, or wood flour in a mix comprising an adhesive, the mix being extruded through a die having a cross section depending on the type of corrugation involved. In other words the corrugated element is extruded in its corrugated form through the die and the plastic mass that forms the corrugated element sets as it emerges from the die.

Hot air or other suitable heating means may assist in the setting and drying of the extruded corrugated material.

I may employ as the composition to be extruded in the form of a corrugated structure a mass comprising excelsior or wood wool and a binder which may comprise lignin or alternatively a suitable thermosetting or a thermoplastic resin such as for example phenol formaldehyde condensation product or any of the well known vinyl compounds or other suitable adhesive resinous or plastic compositions well known in this art. The excelsior is boiled in dilute sulphuric acid, then drained, and neutralized, whereupon it may be molded, pressed or extruded with the addition of aniline or furfural if a resinous combination is desired. Alternatively to using excelsior as the base material, I may employ cotton flock.

The complete corrugated structure comprising upper and lower liners and the centrally attached corrugated element is extruded. The apparatus used is an extrusion die with upper, and lower slots and a central sine curve slot that meets the upper and lower slots, the central slot being formed for example by a series of curved blocks set in the die head.

When the composition extruded is thermoplastic, it is heated prior to extrusion and cooled after extrusion.

Suitable heat may be applied by hot air or steam or hot water pipes and cooling means by suitable cooling and refrigerating devices in zones which are determined by the particular nature of the thermosetting or thermoplastic resin to be employed.

If the rods 88 and 89 are to be withdrawn having simply been used as core elements, then I may apply heat directly through the rods 88 and 89 as by electric current or by heat by conduction to cause the coatings thereon to soften and lose their adhesive qualities. The rods may thereupon be withdrawn from the corrugations.

In making an armor plating or other building structure in which the rods or tubular inserts 88 and 89 are to be left in place, no such means of withdrawal need be provided.

In Figure 12 I show the corrugated structure formed according to the apparatus shown and described above in which the corrugated strip element 80 is firmly bonded between the upper liner element 104 and the lower liner element 105.

It will be understood that the apparatus shown and described hereinabove can be varied by those skilled in the art without departing from the spirit of my invention. For example, in Figure 11 the crimping or corrugating rolls 82, 83, 84 and 85, may be modified in shape to produce a curved corrugation instead of the rectangular corrugation shown herein. In that case curved cores or inserts 88 and 89 would be employed. The mechanisms involved would still be substantially the same.

Various types of resins may be used for impregnating the fibrous material to form the corrugated structures described herein. For example reference is made to my copending application Serial No. 484,503 which described certain thermo-setting resins which are applied to the fibrous material and which are set by heat and pressure.

I have found that I may obtain a very strong resin impregnated corrugated structure by using diethylene chloride-polystyrene resin, the reaction of which is accelerated by the use of a peroxide as a catalyst. Whereas it is necessary in the case of the phenol formaldehyde condensation resins to employ pressure, in the curing thereof, it is unnecessary to use pressure in curing the diethylene chloride-polystyrene resin. The resin is first heated to a range of 70–80° C. and secondly to a range of 100–120° C. The fibrous material may be impregnated with the resin either by dipping, spraying, brushing or the like.

It is much more difficult from an operating standpoint to employ core elements which must be withdrawn and pressure apparatus in forming corrugated structures than to use simple joining means. It is the object of the present invention to form a corrugated structure impregnated with a hard resin without the necessity for using pressure apparatus and core members. It is a further object of the present invention to make a resin impregnated corrugated structure having relatively high impact strength and substantial tensile strength.

The resin such as the diethylene chloride-polystyrene condensation product which can be cured by heat alone and without the use of pressure is therefore extremely valuable in making a resin impregnated corrugated structure of high impact and high tensile strength without the necessity for using pressure apparatus.

It will be understood that the apparatus and method herein described can be used not only for the manufacture of corrugated structures from resin impregnated sheeting, but may also be used for the manufacture of corrugated sheeting from plain coated or resin impregnated fibrous material such as paper or cardboard, since the shaping and forming apparatuses are believed novel.

In addition to employing paper or cardboard, I may form corrugated structures from cloth, as for example cotton duck, or from cloth woven from glass fibre, such cloths being impregnated with a thermoplastic or thermoadhesive compound, such as phenol formaldehyde or vinyl acetate so that such cloth has when set sufficient rigidity and structural strength to maintain the corrugated structure.

By employing different resins of the type set forth above, I may vary the properties of the final corrugated structure produced so that I may produce a fireproof, water resistant, resin impregnated corrugated structure having either hardness or resilient strength or I may combine various compositions to obtain for example a corrugated structure having an external coating giving high impact strength, and an internal impregnating resin which gives toughness and resilience to the corrugated structure.

The application of adhesives in forming the corrugated structures shown hereinabove will be covered of course by the nature of the material employed. When plain sheet material is employed, then adhesives are necessary to induce adhesion between the liner elements and the corrugated element. When resin impregnated sheet material is employed, the use of added adhesives will depend on whether adhesion can be induced between adjacent sheets by the use of heat and pressure alone as in the case of thermoplastics.

In the case of the use of certain thermosetting impregnated resins adhesion will be induced during the curing of the impregnated sheets when pressed into contact with one another. In other instances added adhesives will be necessary depending upon the strength of the joint required.

Various modifications of my invention will suggest themselves to those skilled in the art. I accordingly desire that in construing the breadth of the appended claim that they shall not be limited to the specific details shown and described in connection with the above explanation.

I claim:

An apparatus for continuously producing corrugated material which comprises means for preshaping fibrous sheet material, a second means for shaping said sheet material into rectangular corrugated form, means for introducing core members into the corrugations formed in said corrugated material, means for advancing said corrugated material containing said core members, means for pressing liner elements in contact with said corrugated material containing said core members, said means for advancing said corrugated material moving at a greater rate of speed than said means for pressing liner elements onto said corrugated material.

GERHART WEISS.